(12) United States Patent
Xiao et al.

(10) Patent No.: US 11,668,440 B2
(45) Date of Patent: Jun. 6, 2023

(54) DEVICE FOR INSTALLING REAR COVER OF LAMP CAP

(71) Applicant: Hefei Wisdom Bridge Information Technology Co., Ltd., Hefei (CN)

(72) Inventors: Yongsheng Xiao, Hefei (CN); Zhen Xiao, Hefei (CN); Zheng Zhang, Hefei (CN)

(73) Assignee: Hefei Wisdom Bridge Information Technology Co., Ltd., Hefei (CN)

( * ) Notice: Subject to any disclaimer, the term of this patent is extended or adjusted under 35 U.S.C. 154(b) by 0 days.

(21) Appl. No.: 17/561,784

(22) Filed: Dec. 24, 2021

(65) Prior Publication Data

US 2022/0186891 A1 Jun. 16, 2022

Related U.S. Application Data

(63) Continuation of application No. PCT/CN2021/125066, filed on Oct. 20, 2021.

(30) Foreign Application Priority Data

Oct. 21, 2020 (CN) .......................... 202011131602.2

(51) Int. Cl.
| | |
|---|---|
| *F21K 9/90* | (2016.01) |
| *F21V 29/70* | (2015.01) |
| *F21S 4/28* | (2016.01) |
| *B23P 19/00* | (2006.01) |
| *F21V 17/10* | (2006.01) |

(52) U.S. Cl.
CPC .............. *F21K 9/90* (2013.01); *B23P 19/002* (2013.01); *F21S 4/28* (2016.01); *F21V 17/101* (2013.01); *F21V 29/70* (2015.01)

(58) Field of Classification Search
CPC ....... B23P 19/00; B23P 19/001; B23P 19/002; B23P 19/003; B23P 19/004; B23P 19/006; B23P 19/007; B23P 19/008; B23P 19/04; B23P 19/10; B23P 19/12; B23P 21/00; B23P 21/002; B23P 21/004; B23P 21/008; F21K 9/90
See application file for complete search history.

(56) References Cited

U.S. PATENT DOCUMENTS

| | | | |
|---|---|---|---|
| 2014/0373337 A1* | 12/2014 | Iwasaki | B23P 19/10 29/559 |
| 2022/0186891 A1* | 6/2022 | Xiao | F21V 29/70 |

(Continued)

FOREIGN PATENT DOCUMENTS

| | | |
|---|---|---|
| CN | 103307487 A | 9/2013 |
| CN | 103624543 A | 3/2014 |

(Continued)

*Primary Examiner* — Christopher M Koehler

(57) ABSTRACT

A device for installing a rear cover of an intelligent lamp cap, including a first feeding device for feeding a heat sink base and a second feeding device for feeding a LED lamp bead out to an outlet of the first feeding device and assembling the LED lamp bead with the heat sink base. A lead wire threading device is arranged on a side of a positioning-mounting mechanism, and is configured to guide a lead wire of the LED lamp bead to pass through a mounting hole of the heat sink base. A third feeding device is arranged on a side of the outlet of the first feeding device to mount a bottom cover on the heat sink base.

10 Claims, 14 Drawing Sheets

(56) References Cited

U.S. PATENT DOCUMENTS

2022/0186892 A1\*  6/2022  Xiao .......................... F21K 9/90
2022/0186920 A1\*  6/2022  Shi ......................... F21S 41/192

FOREIGN PATENT DOCUMENTS

| CN | 104440075 | A | 3/2015 |
| CN | 107030464 | A | 8/2017 |
| CN | 206811469 | U | 12/2017 |
| CN | 108655725 | A | 10/2018 |
| CN | 111215885 | A | 6/2020 |
| CN | 112283604 | A | 1/2021 |
| CN | 112355628 | A | 2/2021 |
| CN | 112361237 | A | 2/2021 |
| CN | 112404922 | A | 2/2021 |
| CN | 112404923 | A | 2/2021 |
| GB | 2586905 | A | 3/2021 |

\* cited by examiner

DEVICE FOR INSTALLING REAR COVER OF LAMP CAP

CROSS-REFERENCE TO RELATED APPLICATIONS

This application is a continuation of International Patent Application No. PCT/CN2021/125066, filed on Oct. 20, 2021, which claims the benefit of priority from Chinese Patent Application No. 202011131602.2, filed on Oct. 21, 2020. The content of the aforementioned application, including any intervening amendments thereto, is incorporated herein by reference in its entirety.

TECHNICAL FIELD

The present application relates to LED lamp assembly, and more particularly to a device for installing a rear cover of an intelligent lamp cap.

BACKGROUND

In the actual application, a lens is generally arranged outside a LED lamp bead of a vehicle lamp cap to enhance the brightness of the LED lamp cap and achieve a light-condensing effect, so as to allow for a higher penetrability. In the actual assembling process, the LED lamp bead is fixedly arranged on the heat sink base through a reflection bowl. The heat sink base is provided with a groove for accommodating the LED lamp bead. The reflection bowl is fixedly arranged on the heat sink base through screws. A lead wire of the LED lamp bead passes through a through hole on the heat sink base. After the installation of the LED lamp cap and the heat sink base, the heat sink base is introduced into the lamp tube of the lamp cap to realize the connection between the heat sink base and the lamp tube. An end of the lamp tube is provided with a lens to form the LED lamp cap. The LED lamp cap can be installed in the vehicle headlight for actual use. Nevertheless, the assembly of the LED lamp cap is usually performed manually, resulting in a poor assembling efficiency. Moreover, after the lead wire of the LED lamp bead passes through the through hole on the heat sink base, the LED lamp bead is prone to be separated from the lead wire when the lead wire is drawn by an external force, resulting in the scrap of the lamp cap.

SUMMARY

An object of the present disclosure is to provide a device for installing a rear cover of an intelligent lamp cap to improve the production efficiency and quality of the LED lamp cap and enhance the protection for the LED lamp wick.

Technical solutions of this application are described as follows.

The present disclosure provides a device for installing a rear cover of an intelligent lamp cap, comprising:
 a first feeding device; and
 a second feeding device;
 wherein the first feeding device is configured to lead a heat sink base out; the second feeding device is configured to feed a LED lamp bead to an outlet of the first feeding device and assemble the LED lamp bead with the heat sink base; a lead wire threading device is arranged on a side of a positioning-mounting mechanism; the lead wire threading device is configured to guide a lead wire of the LED lamp bead to pass through a mounting hole of the heat sink base; a third feeding device is arranged on a side of the outlet of the first feeding device; and the third feeding device is configured to mount a bottom cover on the heat sink base.

In an embodiment, the lead wire threading device is arranged on a side of a positioning-mounting mechanism. The lead wire threading device is configured to guide a lead wire of the LED lamp bead to pass through a mounting hole of the heat sink base.

In an embodiment, the third feeding device is arranged on a side of the outlet of the first feeding device; and the third feeding device is configured to mount a bottom cover on the heat sink base.

In an embodiment, the first feeding device is provided with a vibration plate; an outlet of the vibration plate is provided with a lead-out rail; an outlet of the lead-out rail is provided with an extraction rack; the extraction rack is arranged on a turnover mechanism; the turnover mechanism is configured to drive the extraction rack to rotate by 180°, wherein a rotation axis of the extraction rack is arranged horizontally; the third feeding device is arranged on one side of the extraction rack, and a fourth feeding device is arranged on the other side of the extraction rack for feeding a lamp tube.

In an embodiment, the extraction rack is provided with two extraction rods; the two extraction rods are arranged horizontally and spaced apart; the two extraction rods are configured to move horizontally to respectively form a plug-in clamping fit with two notches on the heat sink base; the outlet of the lead-out rail is provided with a baffle plate; a surface of the lead-out rail is provided with two openings configured to respectively avoid the two extraction rods; the two extracting rods are slidably arranged on the extraction rack; each of the two extraction rods is sleevedly provided with a return spring; one end of the return spring abuts against one of the two extraction rods, and the other end of the return spring abuts against the extraction rack; the extraction rack is provided with a first cylinder; the first cylinder is arranged in parallel with the two extraction rods; and a piston rod of the first cylinder is connected to the two extraction rods.

In an embodiment, the turnover mechanism comprises a turnover base; the turnover base is rotatably connected with the extraction rack; the extraction rack is provided with a deflection rod; the deflection rod is hinged with a piston rod of a second cylinder; the piston rod of the second cylinder and the deflection rod are arranged vertically; and the second cylinder is hingedly arranged on the turnover base.

In an embodiment, a support base is provided on a side of the turnover mechanism; the support base is provided with a groove configured to clamp the heat sink base; the support base is provided with a support slide rod; the support slide rod is vertically and slidably arranged on a rack; the support slide rod is sleevedly provided with a support spring; and one end of the support spring abuts against the rack, and the other end of the support spring abuts against the support base.

In an embodiment, the second feeding device comprises a feeding rack; the feeding rack is provided with a clamping block configured to clamp the LED lamp bead; the clamping block is configured to move vertically to allow the LED lamp bead to be guided into a groove of the heat sink base; and a side of the clamping block is provided with a lead wire rack configured to support a wire bundle.

In an embodiment, a gluing mechanism is provided below the clamping block; the gluing mechanism is configured to dispense a glue on the groove of the heat sink base; the gluing mechanism comprises a gluing nozzle; the gluing nozzle is arranged on the lifting mechanism; the lifting mechanism is configured to move the gluing nozzle vertically to abut against or be separated from a bottom of the groove of the heat sink base.

In an embodiment, the clamping block is vertically arranged on a rail; the rail is provided with a return spring; an upper end of the return spring abuts against an upper end of the rail, and a lower end of the return spring abuts against an upper surface of the clamping block; a drive head is arranged above the clamping block; an upper end of the drive head is connected with a piston rod of a driving cylinder; and the driving cylinder is arranged vertically.

In an embodiment, the clamping block is vertically and slidably arranged on a lifting block; a compression spring is arranged between the clamping block and the lifting block; the lifting block is vertically and slidably arranged on the rail; one end of the return spring abuts against an upper end of the lifting block, and the other end of the return spring abuts against an upper end of the rail.

In an embodiment, a side of the clamping block is provided with two sets of clamping belts configured to clamp the LED lamp bead; an outlet of each of the two sets of clamping belts is provided with a support plate configured to support the LED lamp bead; a side of the support plate is hinged on a frame, wherein a hinge axis is arranged horizontally; the clamping block is arranged above the frame; a bottom of a slot of the clamping block is provided with an air suction port; the air suction port is communicated with an inlet of a suction unit; and the suction unit is configured to adsorb the LED lamp bead.

In an embodiment, the lead wire rack is provided with a grate rack; the grate rack is vertically and slidably provided on a lifting rack through a vertical sliding rod; the lifting rack is horizontally and slidably arranged on the lead wire rack; a vertical spring is sleevedly provided on the vertical sliding rod; one end of the vertical spring is connected to the lead wire rack, and the other end of the vertical spring is connected to the lifting rack; an end of the vertical sliding rod extending out of the lifting rack is provided with a lifting roller; the lifting roller abuts against a lifting folded plate; the lead wire rack is provided with a horizontal cylinder; a piston of the horizontal cylinder is connected to the lifting rack; the lifting folded plate is arranged in parallel with the horizontal cylinder.

In an embodiment, the heat sink base is provided with a notch configured to accommodate a wire bundle; the notch is arranged along an axial direction of the heat sink base; the third feeding device comprises a feeding pipe; a pipe core of the feeding pipe is horizontal and arranged in parallel with the extraction rack of the first feeding device; a mouth of the feeding pipe is arranged close to or away from an end of the heat sink base on the extraction rack; an edge of the bottom cover is provided with an opening corresponding to the notch of the heat sink base; and the opening is configured to accommodate the wire bundle.

In an embodiment, an inlet of the feeding pipe is provided with a vertical lead-in pipe; an outlet of the vertical lead-in pipe is communicated with an inlet of the feeding pipe; the vertical lead-in pipe has a flat-pipe structure, and a cavity of the vertical lead-in pipe is configured as a channel to allow the bottom cover to pass through; and the vertical lead-in pipe is configured to allow the bottom cover to be vertically introduced into the feeding pipe.

In an embodiment, a pipe wall of the feeding pipe is provided with an elongated opening; the elongated opening is tubularly arranged along a length direction of the feeding pipe; a positioning sliding rod is provided in the elongated opening; and the positioning sliding rod is arranged along a length direction of the elongated opening.

In an embodiment, a lead-out head is provided in the cavity of feeding pipe; a positioning elastic piece is provided on an inner wall of the feeding pipe; the positioning elastic piece is arranged along the length direction of the feeding pipe and extends out of the inner wall of the feeding pipe; the lead-out head and the positioning elastic piece are arranged spaced apart; a gap between the lead-out head and the positioning elastic piece is configured as an inlet for the bottom cover.

In an embodiment, the lead-out head is provided with bristles; the lead-out head is rotatably arranged on a lead-out rack; the lead-out rack is arranged on a lead-out mechanism; an end of the lead-out head is connected to a driving unit; the driving unit is configured to drive the lead-out head to rotate, wherein a rotation axis of the lead-out head is arranged in parallel with the feeding pipe.

In an embodiment, the driving unit is a rotating motor provided on the lead-out rack; the rotating motor is configured to drive the lead-out head to rotate; the lead-out mechanism comprises a lead-out cylinder; the lead-out cylinder is connected to the lead-out rack; and the lead-out cylinder is arranged in parallel with the feeding pipe.

In an embodiment, the lead wire threading device comprises a threading base rotatably connected to the turnover base; a hinged shaft of the turnover base is arranged horizontally; the turnover mechanism is configured to drive the turnover base to rotate by 180°.

In an embodiment, a compression rod is provided at a side of the threading base; the compression rod abuts against a lead wire of a LED lamp wick; and the compression rod is configured to move vertically to abut against or be separated from the LED lamp wick.

In an embodiment, the turnover mechanism comprises a turnover gear connected to an end of the hinged shaft of the turnover base; the turnover gear is engaged with a turnover gear rack; and the turnover gear rack is arranged horizontally; and an end of the turnover gear rack is connected to a piston of a third cylinder.

Compared with the prior art, this application has the following beneficial effects. During the assembly of a LED lamp cap by using the device provided herein, the first feeding device feeds the heat sink base to an outlet of the first feeding device in a specific posture. The second feeding device feeds the LED lamp bead to the mounting groove of the heat sink base. After that, the fourth feeding device feeds the lamp tube to the heat sink base to realize the automatic assembly of individual parts. The device provided herein can improve the production efficiency and quality of the LED lamp cap and enhance the protection for the LED lamp wick.

DETAILED DESCRIPTION OF EMBODIMENTS

Figure 1:
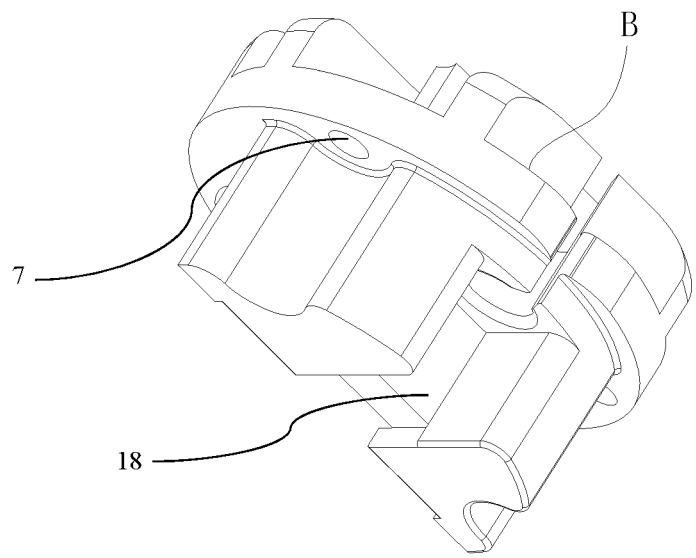
FIG. 1 schematically shows a structure of a heat sink base according to an embodiment of the present disclosure.

To make the object and beneficial effects clearer, the disclosure will be described in detail below with reference to the accompanying drawings and embodiments. It should be noted that the following description is only illustrative of the present disclosure, and are not intended to limit the scope of the present disclosure. As used herein, the terms "parallel" and "perpendicular" are not strictly limited to their geometric definitions, but include tolerances for reasonable and inconsistent machining or human errors.

The device provided herein for installing a rear cover an intelligent lamp cap will be described in detail with an automatic production system for LED lamp cap 1.

The features of the automatic production system of the LED lamp cap 1 are specifically described below.

Provided herein is a system for automatically producing a LED lamp cap 1, which includes a first feeding device 10, a second feeding device 20, and a third feeding device 30. The first feeding device 10 is configured to lead a heat sink base B out. The second feeding device 20 is configured to lead a reflection bowl A out to an outlet of the first feeding device 10 to achieve the assembly of the reflection bowl and the heat sink base. The third feeding device 30 is configured to feed a LED lamp bead C to the outlet of the first feeding device 10 to achieve the assembly of the LED lamp bead and the heat sink base. A fourth feeding device 40 is arranged on a side of the first feeding device 10 for feeding a lamp tube D. A positioning-mounting mechanism is arranged on a side of the fourth feeding device 40. The positioning-mounting mechanism is configured to achieve the assembly of the lamp tube and the heat sink base.

Figure 2:
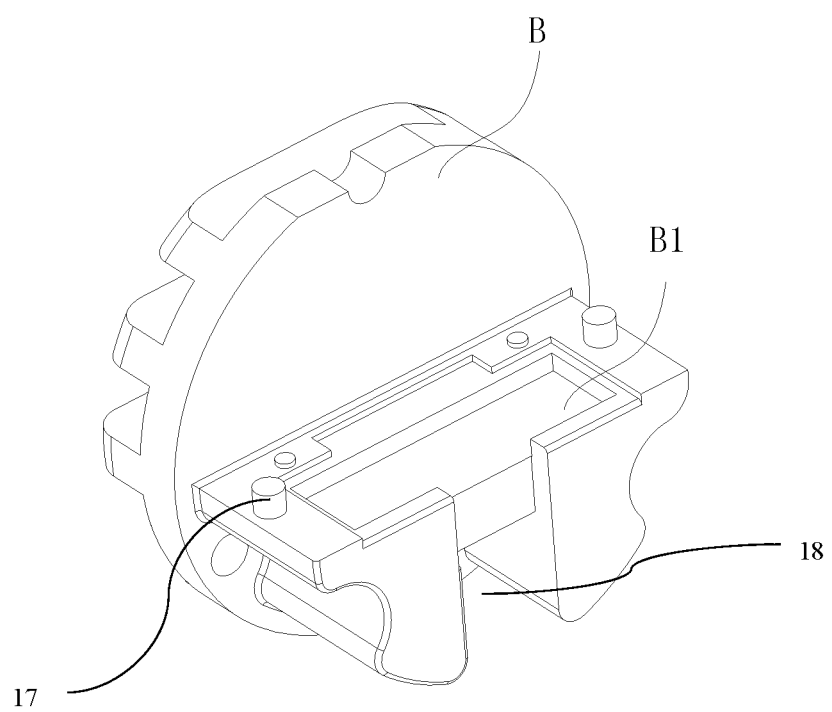
FIG. 2 schematically shows the structure of the heat sink base according to an embodiment of the present disclosure from another perspective.
Figure 3:
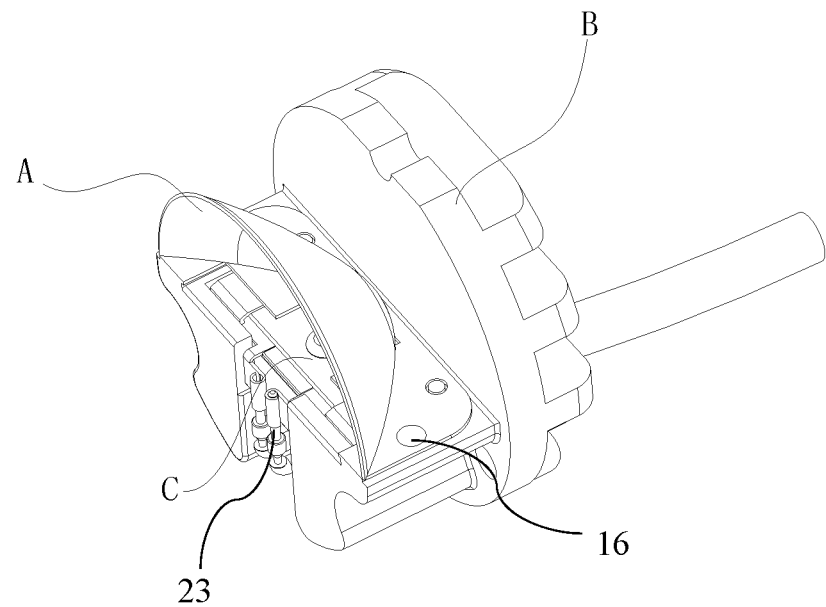
FIG. 3 is a structural diagram of the heat sink base, a LED lamp wick, and a reflection bowl according to an embodiment of the present disclosure.
Figure 4:
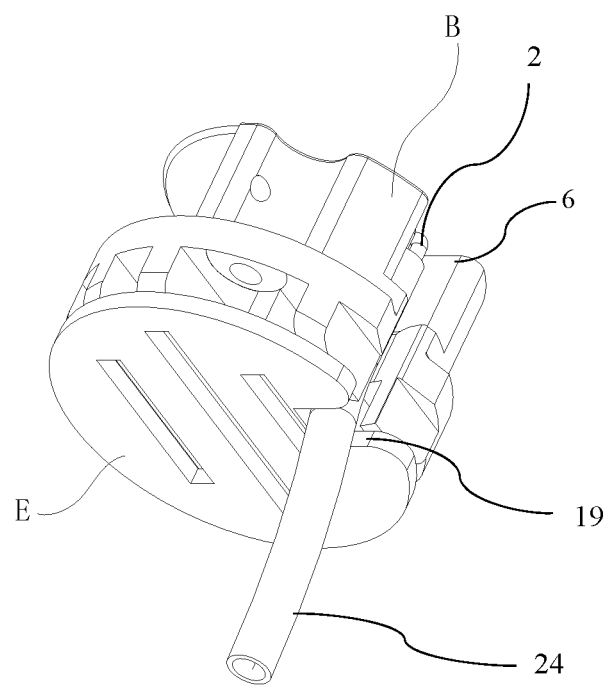
FIG. 4 is a structural diagram of the heat sink base after a bottom cover is mounted.
Figure 5:
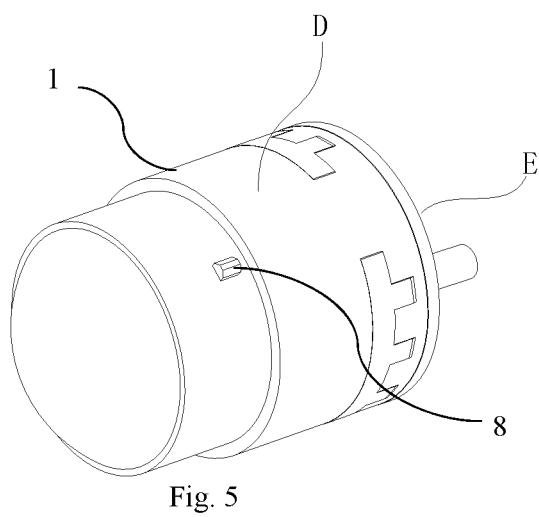
FIG. 5 is a structural diagram of a LED lamp cap according to an embodiment of the present disclosure.
Figure 6:
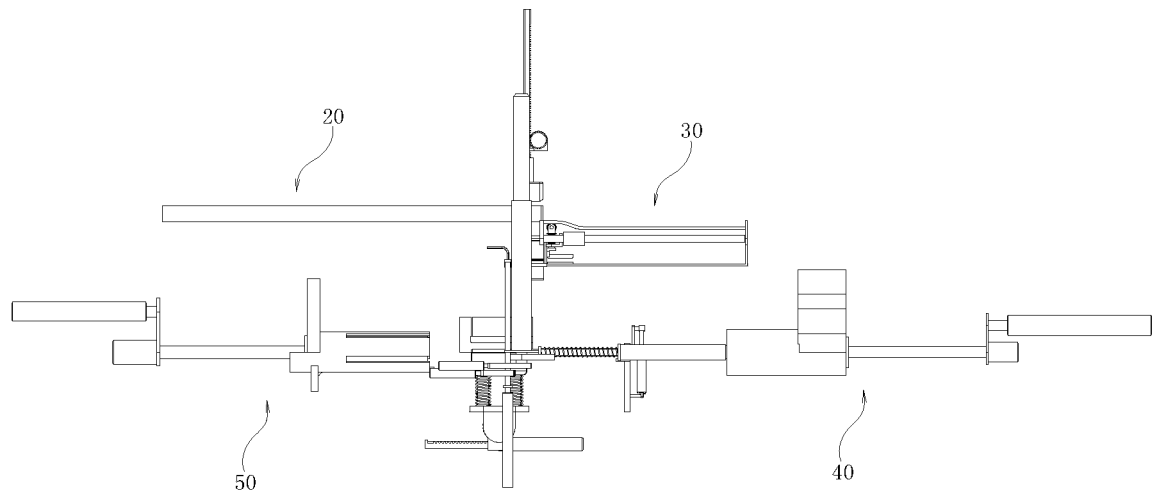
FIG. 6 is a front view of an automatic production system for the LED lamp cap according to an embodiment of the present disclosure.
Figure 7:
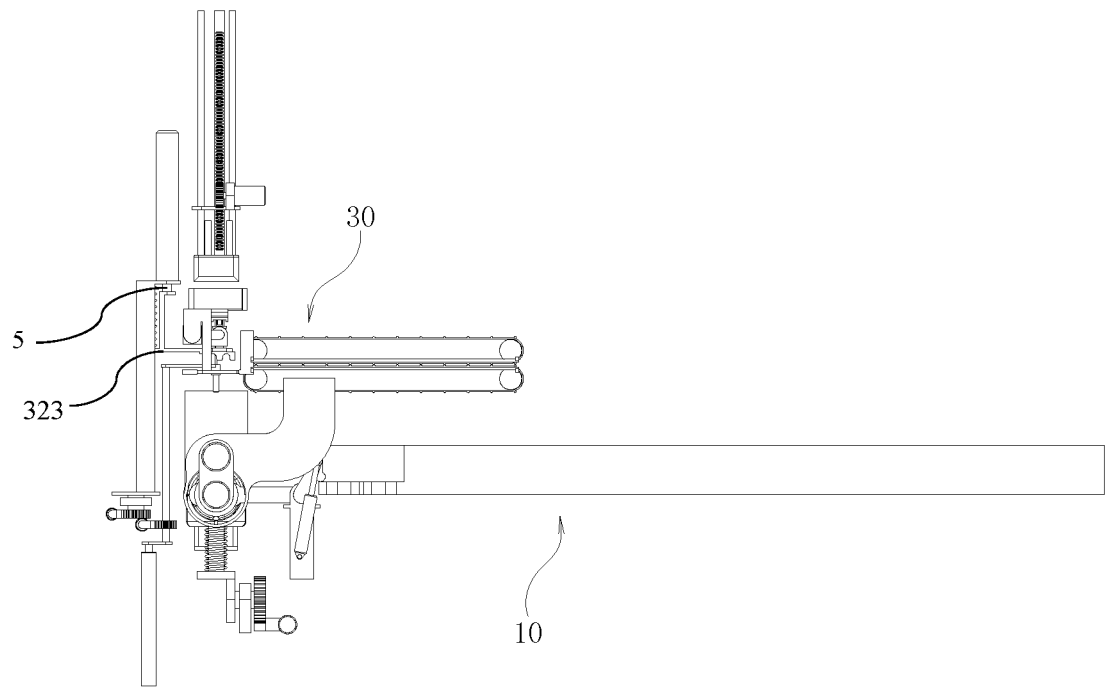
FIG. 7 is a left side view of the automatic production system for the LED lamp cap according to an embodiment of the present disclosure.
Figure 8:
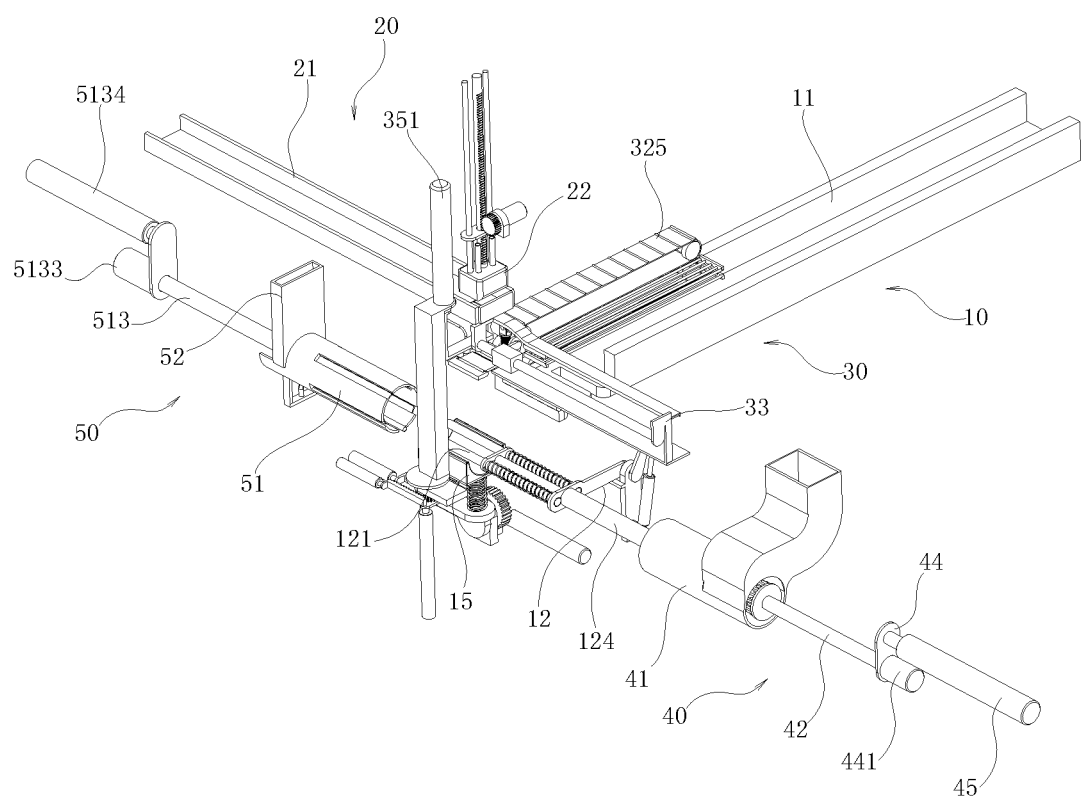
FIG. 8 schematically shows a structure of the automatic production system for the LED lamp cap according to an embodiment of the present disclosure.
Figure 9:
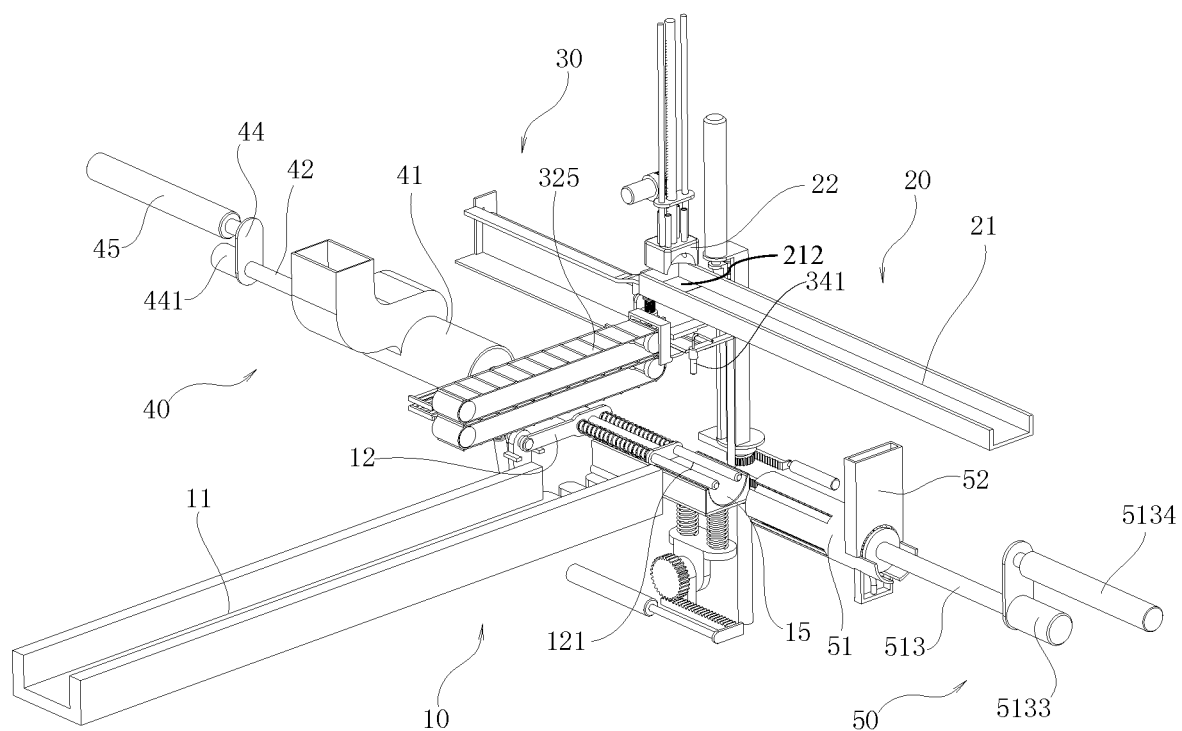
FIG. 9 schematically shows the structure of the automatic production system for the LED lamp cap according to an embodiment of the present disclosure from another perspective.
Figure 10:
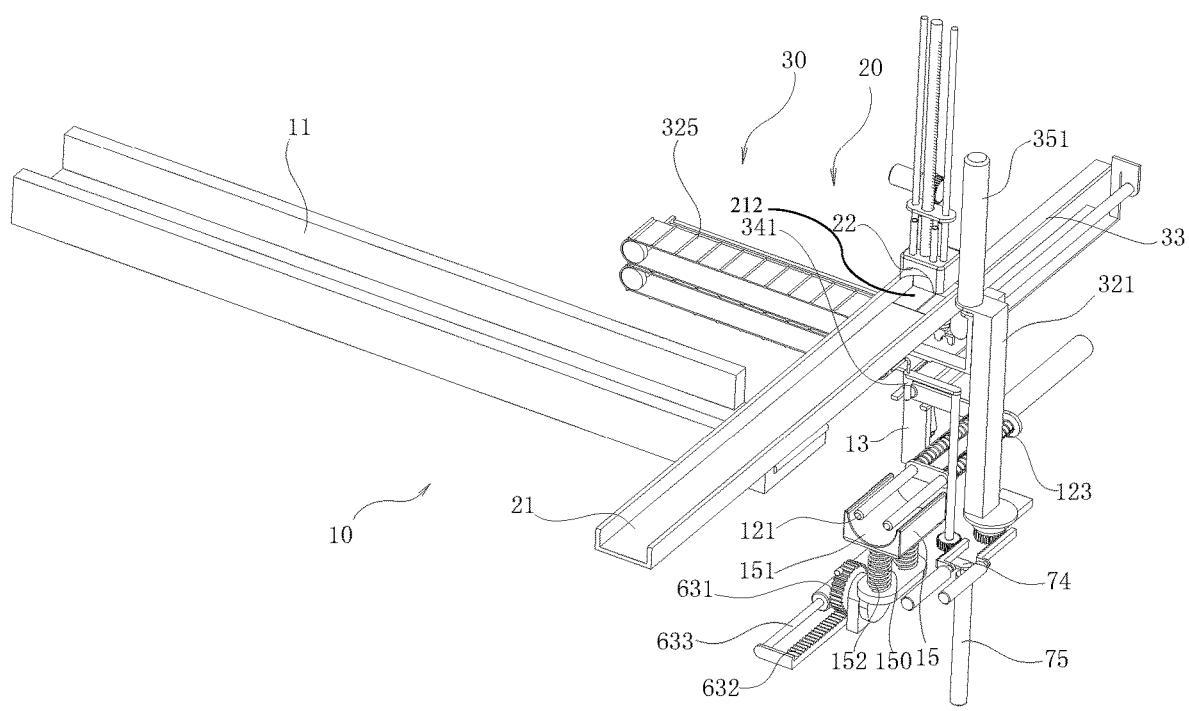
FIG. 10 is a structural diagram of a first feeding device, a second feeding device, and a third feeding device according to an embodiment of the present disclosure.
Figure 11:
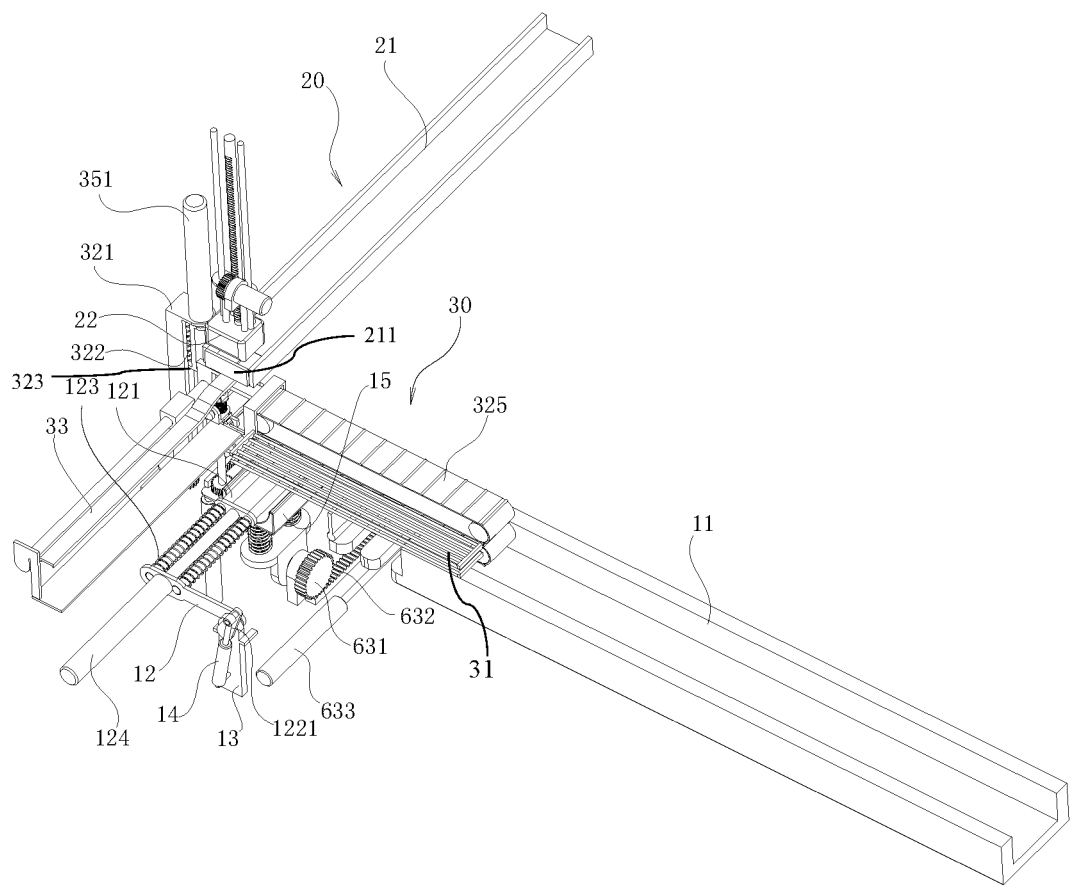
FIG. 11 is a structural diagram of the first feeding device, the second feeding device, and the third feeding device according to an embodiment of the present disclosure from another perspective.
Figure 12:
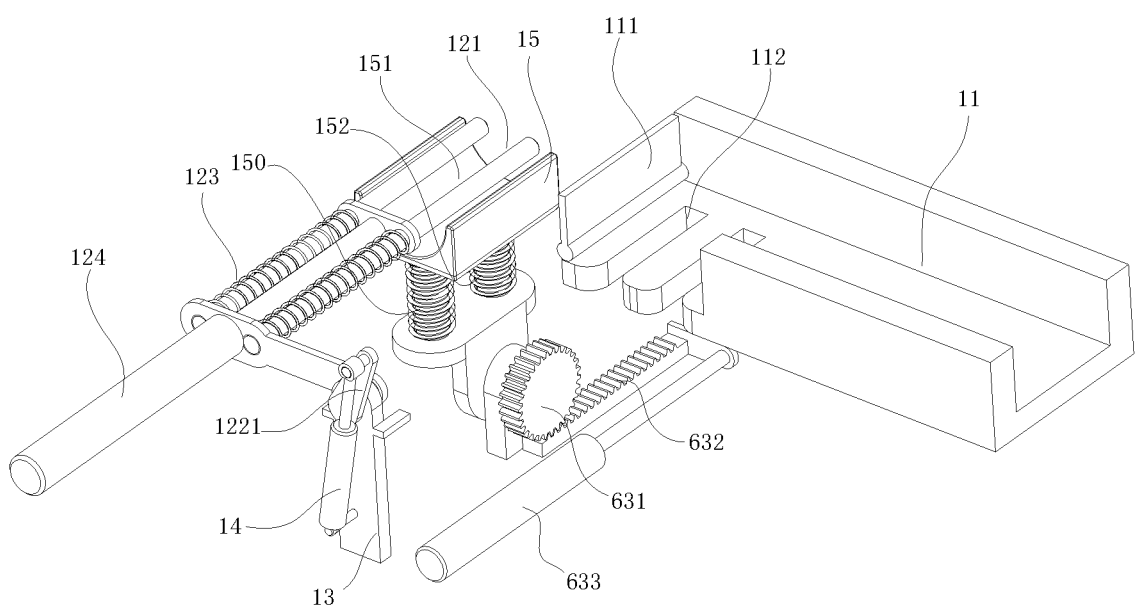
FIG. 12 is a partial structural diagram of the first feeding device according to an embodiment of the present disclosure.
Figure 13:
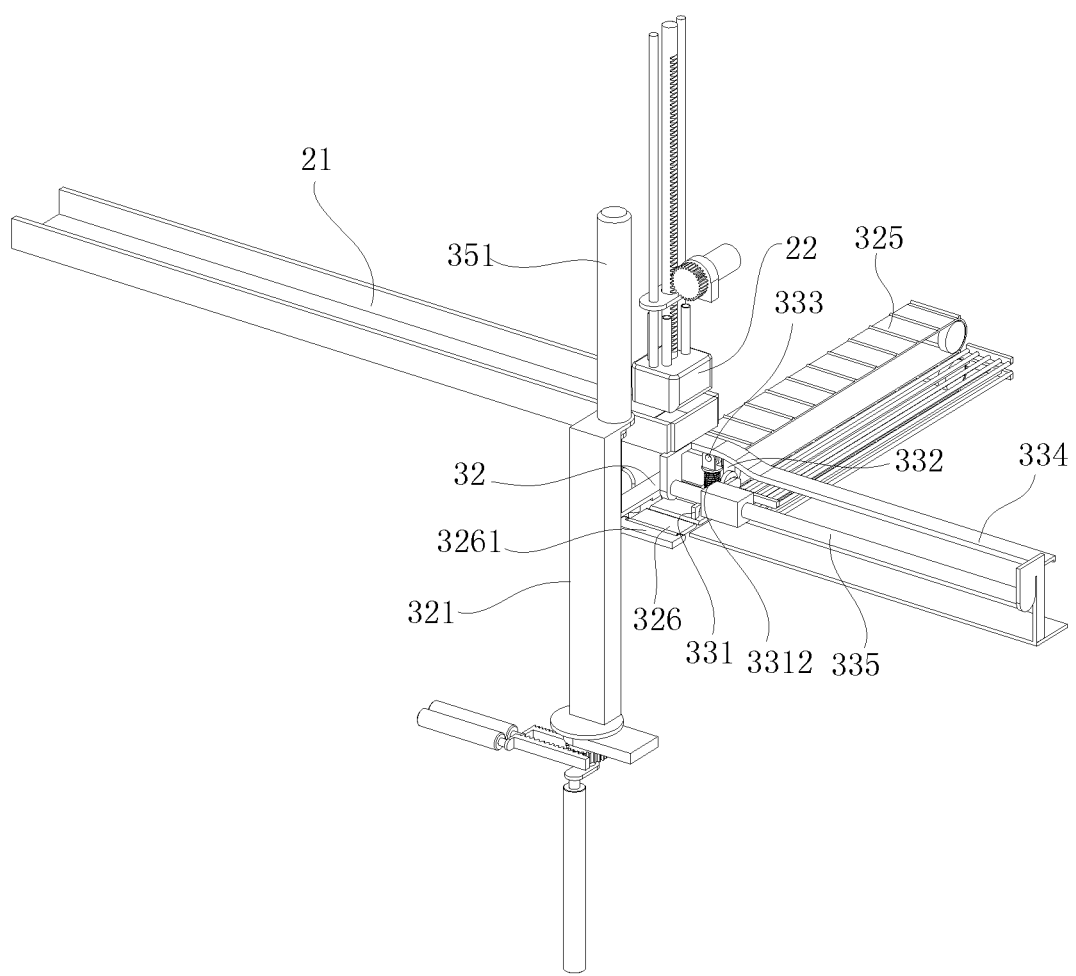
FIG. 13 is a structural diagram of the third feeding device according to an embodiment of the present disclosure.
Figure 14:
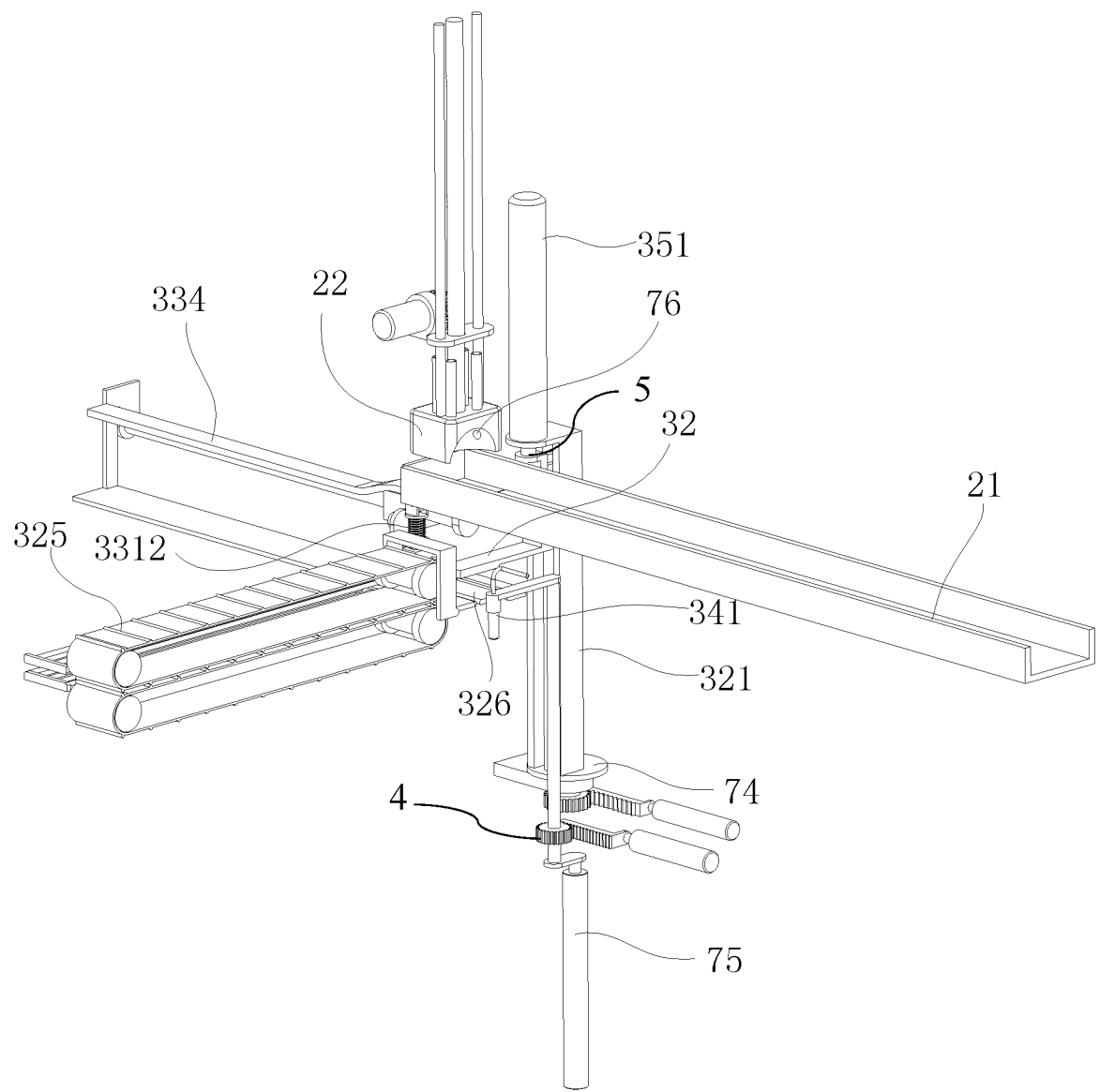
FIG. 14 is a structural diagram of the third feeding device according to an embodiment of the present disclosure from another perspective.
Figure 15:
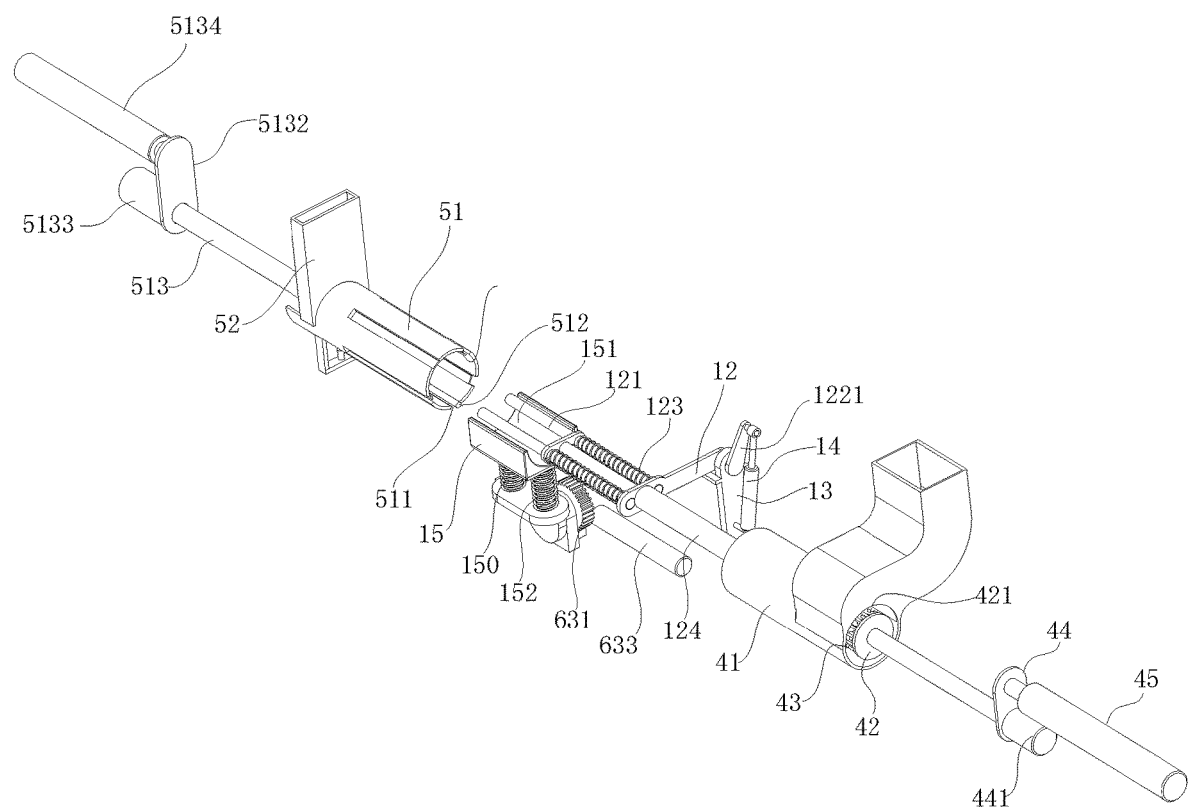
FIG. 15 is a structural diagram of a fourth feeding device and a fifth feeding device according to an embodiment of the present disclosure.
Figure 16:
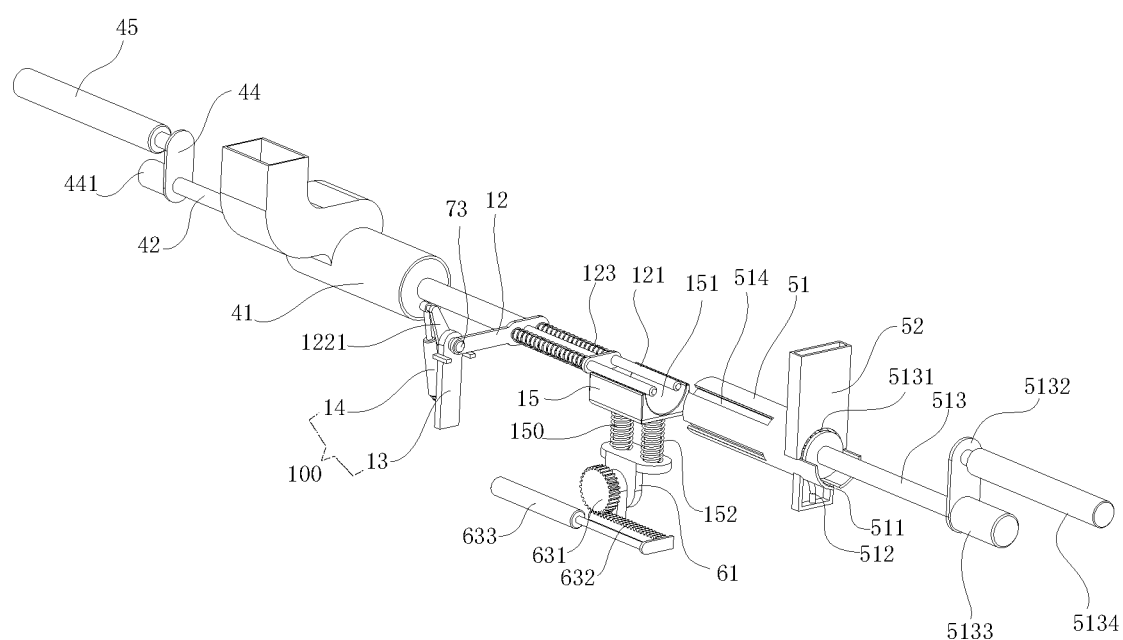
FIG. 16 is a structural diagram of the fourth feeding device and the fifth feeding device according to an embodiment of the present disclosure from another perspective.
Figure 17:
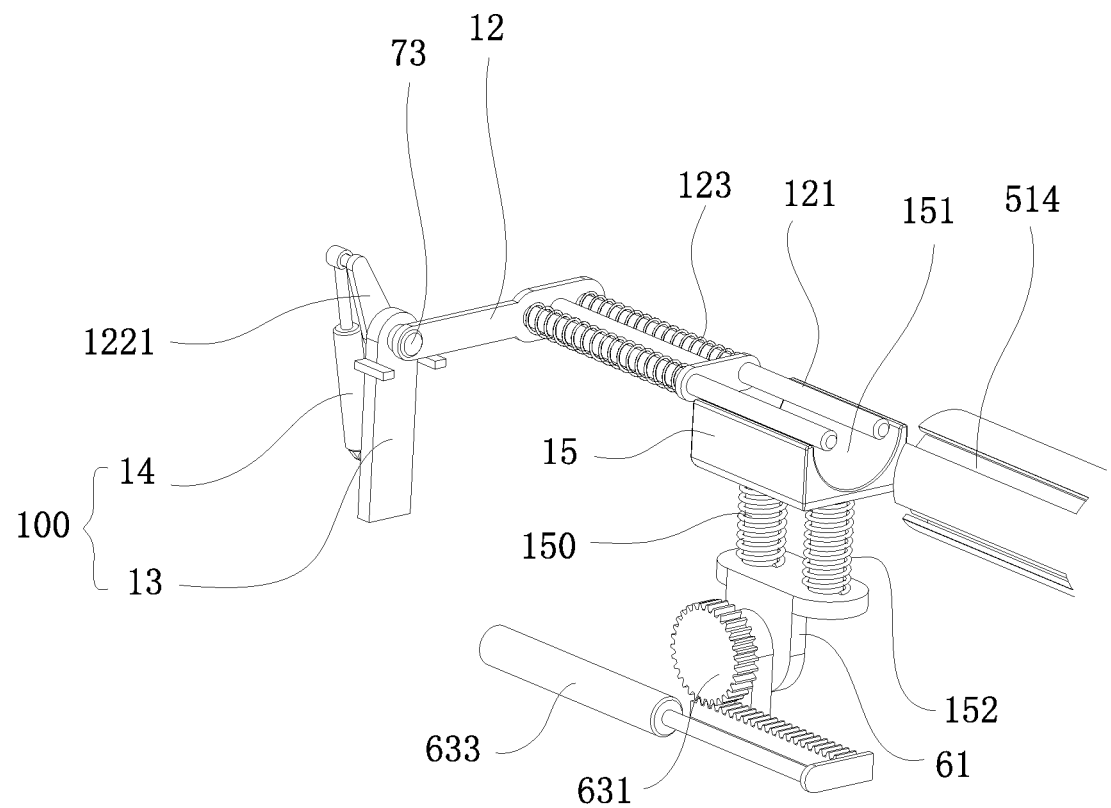
FIG. 17 is a close-up view of the turnover mechanism 100 shown in FIG. 16.

As shown in FIGS. 1-7, during the assembly of the LED lamp cap 1, the first feeding device 10 feeds the heat sink base to the outlet of the first feeding device 10 in a specific posture; the second feeding device 20 feeds the reflection bowl to upper position above the heat sink base in a specific posture; the third feeding device 30 feeds the LED lamp bead to the mounting groove B1 on the heat sink base. Then the reflection bowl is mounted on the heat sink base. After that, the fourth feeding device 40 feeds the lamp tube to be mounted outside the heat sink base to realize the automatic assembly of individual parts. The automatic production system provided herein can improve the production efficiency and quality of the LED lamp cap 1 and enhance the protection for the LED lamp wick 23.

In this embodiment, a lead wire threading device is arranged on a side of the positioning-mounting mechanism, and the lead wire threading device is configured to allow a lead wire 2 of the LED lamp bead to pass through a mounting hole of the heat sink base.

The lead wire threading device is configured to effectively thread the lead wire 2 of the LED lamp into the mounting hole of the heat sink base, thereby effectively ensuring that the lead wire 2 can pass through an end of the heat sink base and be led out from an end of the lamp tube to achieve the assembly of parts of a vehicle lamp assembly and complete the automatic production of LED lamp cap 1.

To further enhance the automatic production of the lamp cap, a fifth feeding device 50 is arranged on a side of the outlet of the first feeding device 10 and is configured to mount a bottom cover on the heat sink base.

In the actual production, to enable the automatic production of the LED lamp cap 1, a bottom cover is provided at an end of the LED lamp cap 1 away from a lens and the bottom cover is screwedly connected to the heat sink base arranged in the lamp tube, thereby realizing a stable connection of the heat sink base, the lamp tube and the bottom cover. The lead wire 2 of the LED lamp wick 23 passes through the bottom cover to realize the automatic production of the LED lamp cap 1.

To guide the heat sink base, the first feeding device 10 includes a first vibration plate 11. An outlet of the first vibration plate is provided with a first lead-out rail 11. An outlet of the first lead-out rail 11 is provided with an extraction rack 12. The extraction rack 12 is arranged on a turnover mechanism 100. The turnover mechanism 100 is configured to drive the extraction rack 12 to rotate by 180°, where a rotation axis of the extraction rack 12 is arranged horizontally. The fifth feeding device 50 is arranged on one side of the extraction rack 12, and the fourth feeding device 40 is arranged on the other side of the extraction rack 12 for feeding a lamp tube.

The heat sink bases are distributed in the first vibration plate. The first vibration plate leads the heat sink base out from an outlet of the first vibration plate to the outlet of the first lead-out rail 11. A mounting surface of the heat sink base for mounting the LED lamp wick 23 is configured to face downward. An axis of the heat sink base is horizontal. The extraction rack 12 is configured to implement the plug-in feeding of the heat sink base. The turnover mechanism 100 is turned on to rotate the heat sink base by 180°, such that the mounting surface of the heat sink base for mounting the LED wick faces upwards, facilitating the assembly of the LED lamp wick 23.

In this embodiment, the extraction rack 12 is provided with two extraction rods 121. The two extraction rods 121 are arranged horizontally and spaced apart. The two extraction rods 121 are configured to move horizontally to respectively be in plug-in clamping fit with two notches 7 on the heat sink base. The outlet of the first lead-out rail 11 is provided with a baffle plate 111. The surface of the first lead-out rail 11 is provided with two avoiding openings 112, in which the two avoiding openings 112 are configured to avoid the two extraction rods 121. The two extracting rods 121 are slidably arranged on the extraction rack 12. Each of the two extraction rods 121 is sleevedly provided with a return spring 123. One end of the return spring 123 abuts against the extraction rod 121, and the other end of the return spring 123 abuts against the extraction rack 12. The extraction rack 12 is provided with a first cylinder 124. The first cylinder 124 is arranged in parallel with the two extraction rods 121. A piston rod of the first cylinder 124 is connected to the two extraction rods 121.

When the heat sink base is taken by the extraction rack 12, the turnover mechanism 100 is started to drive the extraction rack 12 to turn over, and the two extraction rods 121 respectively form a plug-in fit with the two notches 7 on the heat sink base to allow the two extraction rods 121 to abut against the two notches 7 to implement the picking operation. The turnover mechanism 100 is overturned, such that a mounting surface of the heat sink base faces upwards, facilitating the assembly of the LED lamp wick 23 and the heat sink base. Specifically, the two extraction rods 121 respectively pass through the avoiding openings 112 and are turn to the two notches 7 of the heat sink base to be inserted into the two notches 7 of the heat sink base through the return spring 123, thereby realizing the picking operation of the heat sink base.

In this embodiment, the turnover mechanism 100 includes a turnover base 13. The turnover base 13 is rotatably connected with two avoiding openings 112. The extraction rack 12 is provided with a deflection rod 1221. The deflection rod 1221 is hinged with a piston rod of a second cylinder 14. The piston rod of the second cylinder 14 and the deflection rod 1221 are vertically arranged. The second cylinder is hingedly arranged on the turnover base 13.

During the turn-over operation of the extraction rack 12, the second cylinder 14 is turned on to allow the extraction rack 12 to rotate by 180°, which can allow the mounting surface of the heat sink base for mounting the LED lamp wick 23 to face upwards, facilitating the subsequent arrangement of the LED lamp wick 23.

A support base 15 is arranged on a side of the turnover mechanism 100. The support base 15 is provided with a groove 151. The groove 151 is configured to clamp the heat sink base. The support base 15 is provided with a support slide rod 150. The support slide rod 150 is vertically and slidably arranged on a rack. The support slide rod 150 is sleevedly provided with a support spring 152. One end of the support spring 152 abuts against the rack, and the other end of the support spring 152 abuts against the support base 15.

After the heat sink base is led out from the outlet of the first lead-out rail 11 by the extraction rack 12 to the support base 15, the support base 15 is elastically supported by the support spring 152, which can effectively avoid damage to the LED lamp wick 23 caused by an uneven pressure during the assembly process of the heat sink base and the LED lamp wick 23, thereby ensuring the quality of the finished LED lamp cap 1.

In an embodiment, the third feeding device 30 includes a feeding rack 31. The feeding rack 31 is provided with a clamping block 32 configured to clamp the LED lamp bead. The clamping block 32 is configured to move vertically to allow the LED lamp bead to be guided into a mounting groove of the heat sink base. A side of the clamping block 32 is provided with a lead wire rack 33 configured to support a wire bundle 24.

The LED lamp beads and the lead wire 2 are connected in advance through an automatic welding device. The LED lamp bead welded with the lead wire 2 is placed on the feeding rack 31 and fed to the clamping block 32 to be clamped to fixedly arrange the LED lamp wick 23 in the groove of the mounting surface of the heat sink base, thereby realizing the fixed installation of the LED lamp wick 23 on the heat sink base. The lead wire rack 33 can effectively support and guide the wire bundle 24 to avoid the twisting of the wire bundle 24, thereby helping the wire bundle 24 pass through the mounting hole of the heat sink base to lead out the heat sink base and the lead wire 2.

In an embodiment, to ensure the fixing reliability of the LED lamp wick 23 on the heat sink base and prevent the LED lamp wick 23 from being moved out of the groove of the heat sink base, a gluing mechanism is provided below the clamping block 32. The gluing mechanism is configured to dispense a glue in the groove of the heat sink base. The gluing mechanism includes a gluing nozzle 341. The gluing nozzle 341 is arranged on a lifting mechanism 4. The lifting mechanism 4 is configured to drive the gluing nozzle 341 to move vertically to abut against or be separated from a bottom of the slot 18 of the heat sink base.

When the glue is dispensed on the groove of the heat sink base, the lifting mechanism 4 drives the gluing nozzle 341 to rise and fall vertically such that the gluing nozzle 341 abuts against the bottom of the slot 18 of the heat sink base. Then the gluing mechanism is turned on to dispense the glue into the groove to allow the LED lamp wick 23 and the heat sink base to be bonded, thereby ensuring the fixing reliability of the LED lamp wick 23 on the heat sink base.

The gluing mechanism is arranged on a deflection plate 74. The deflection plate 74 is connected to a deflection mechanism 75. After the heat sink base is led out from the outlet of the first lead-out rail 11, the deflection mechanism 75 is started to drive the gluing nozzle 341 to move to a position above the mounting surface of the heat sink base. Then the lifting mechanism 4 drives the gluing nozzle 341 to move vertically to abut against a bottom of the mounting groove of the heat sink base to dispense the glue into the mounting groove. After that, the deflection mechanism 75 is reset to avoid affecting the normal installation of the heat sink base.

In an embodiment, the clamping block 32 is vertically arranged on a rail 321. A return spring 322 is arranged on the rail 321. One end of the return spring 322 abuts against an upper end of the rail 321, and the other end of the return spring 322 abuts against an upper surface of the clamping block 32. A drive head 5 is arranged above the clamping block 32. An upper end of the drive head 5 is connected to a piston rod of a third cylinder 351. The third cylinder 351 is arranged vertically.

When mounting the LED lamp wick 23 on the mounting surface of the heat sink base, the third cylinder 351 is turned on to lower the drive head 5 to allow the clamping block 32 to move vertically along the rail 321 such that the LED lamp wick 23 below the clamping block 32 is vertically clamped in the groove of the heat sink base to realize the assembly of the heat sink base and the LED lamp wick 23.

In an embodiment, the clamping block 32 is vertically and slidably arranged on a lifting block 323. A compression spring is arranged between the clamping block 32 and the lifting block 323. The lifting block 323 is vertically and slidably arranged on the rail 321. One end of the return spring 322 abuts against an upper surface of the lifting block 323, and the other end of the return spring 322 abuts against an upper end of the rail 321.

In the vertical movement of the clamping block 32, the clamping block 32 is elastically connected to the lifting block 323 through the compression spring. Then the third cylinder 351 is turned on to allow the clamping block 32 to elastically abut against the support base 15 to avoid the damage to the LED lamp wick 23 caused by the compression from the clamping block 32 and the support base 15, thereby ensuring the quality of the LED lamp cap 1.

To implement the guide of the LED lamp bead to realize the automatic production of the LED lamp cap 1, a side of the clamping block 32 is provided with two sets of clamping belts 325 configured to clamp the LED lamp bead. An outlet of each of the two sets of clamping belts 325 is provided with a support plate 326 configured to support the LED lamp bead. A side of the support plate 326 is hinged on a frame 3261, and a hinged axis is arranged horizontally. The clamping block 32 is arranged above the frame 3261. A bottom of a slot of the clamping block 32 is provided with an air suction port. The air suction port is communicated with an air inlet of a suction unit. The suction unit is configured to adsorb the LED lamp bead.

To implement the feed of the LED lamp bead, the LED lamp bead is clamped between the two sets of clamping belts 325. With a rotation of the two sets of clamping belts 325, the LED lamp bead is automatically guided to the support plate 326 and is clamped at the frame 3261. The clamping block 32 is started to move vertically such that the LED lamp bead can be vertically led out from the frame 3261 to the groove of the mounting surface of the heat sink base. The clamping block 32 is adsorbed through the air suction port to prevent the LED lamp wick 23 from falling off the clamping block 32.

In an embodiment, the lead wire rack 33 is provided with a grate rack 331. The grate rack 331 is vertically and slidably arranged on a lifting rack 332 through a vertical sliding rod. The lifting rack 332 is horizontally and slidably arranged on the lead wire rack 33. The vertical sliding rod is sleeved with a vertical spring 3312. One end of the vertical spring 3312 is connected to the lead wire rack 33, and the other end of the vertical spring 3312 is connected to the lifting rack 332. An end of the vertical sliding rod 3312 extending out of the lifting rack 332 is provided with a lifting roller 333. The lifting roller 333 abuts against a lifting folded plate 334. The lead wire rack 33 is horizontally provided with a fourth cylinder 335. A piston of the fourth cylinder 335 is connected to the lifting rack 332. The lifting folded plate 334 is arranged in parallel with the fourth cylinder 335.

The lead wire 2 of the LED lamp wick 23 below the clamping block 32 is straightened to help the lead wire 2 to be threaded into the through hole on the heat sink base. Specifically, the fourth cylinder 335 is turned on to move the lifting rack 332 horizontally and allow the lifting roller 333 to abut against the lifting folded plate 334 such that the grate rack 331 can abut against the wire bundle 24. As the grate rack 331 moves horizontally, the wire bundle 24 is straightened to help the lead wire 2 to pass through the through hole on the heat sink base to complete the threading of the wire bundle 24 on the heat sink base.

The second feeding device 20 includes a second lead-out rail 21 arranged above the outlet of the third feeding device 30. A compression joint 22 is provided at an outlet of the second lead-out rail 21. The compression joint 22 is provided with a groove configured to accommodate the reflection bowl. An adsorption mechanism 76 is arranged in the compression joint 22 and is configured to adsorb the reflection bowl.

The reflection bowl is placed in the second vibration plate, and then the second vibration plate is fed to the second lead-out rail 21. The compression joint 22 is started to move vertically to vertically press the reflection bowl at the outlet of the second lead-out rail 21 to the heat sink base. Then the adsorption mechanism 76 implements the adsorption of the reflection bowl to prevent the reflection bowl from falling down from the groove of the compression joint 22.

In an embodiment, to facilitate the fixing assembly of the reflection bowl and the heat sink base, the reflection bowl is provided with a clamping hole 16. A clamping boss 17 is arranged on a side of a slot 18 on the heat sink base for clamping a LED lamp wick 23. The clamping boss 17 is in plug-in fit with the clamping hole 16 arranged on the reflection bowl.

The compression joint 22 moves vertically to allow the reflection bowl to be fed to a position above the mounting surface of the heat sink base such that the clamping hole 16 on the reflection bowl is in plug-in fit with the clamping boss 17, thereby realizing the assembly of the reflection bowl and the heat sink base.

In an embodiment, the reflection bowl is vertically led out from the outlet of the second lead-out rail 21. The outlet of the second lead-out rail 21 is provided with a baffle plate 211. A bottom of the second lead-out rail 21 is hingedly provided with two crimping plates 212. A hinged shaft of each of the two crimping plates 212 is arranged horizontally and in parallel with the second lead-out rail 21. The hinged shaft is sleeved with a torsion spring. The torsion spring is configured to allow surfaces of the two crimping plates 212 to be horizontal.

In this embodiment, the heat sink base is provided with a notch 6 configured to accommodate a wire bundle 24. The notch 6 is arranged along an axial direction of the heat sink base. The fifth feeding device 50 includes a feeding pipe 51. A pipe core of the feeding pipe 51 is horizontal and arranged in parallel with an extraction rack 12 of the first feeding device 10. A mouth of the feeding pipe 51 is arranged close to or away from an end of the heat sink base on the extraction rack 12. An edge of the bottom cover is provided with an opening 19 corresponding to the notch 6 on the heat sink base. The opening is configured to accommodate the wire bundle 24.

After the reflection bowl is installed on the heat sink base, the fifth feeding device 50 is turned on to lead the bottom cover to the feeding pipe 51 and the bottom cover is allowed to be vertically filled and then is led out from the feeding pipe 51. The notch 6 provided on the heat sink base is configured to effectively clamp the lead wires. The bottom cover is provided with a clamp. The clamp is configured to clamp the lead wire 2, thereby facilitating subsequent lead wire to be led out from an end cover of the LED lamp cap 1.

The pipe end of the feeding pipe 51 points to a position just near the extraction rack 12. When the bottom cover is led out from the mouth of the feeding pipe 51, the bottom cover corresponds to an end of the heat sink base, facilitating the subsequent operations.

In this embodiment, an inlet of the feeding pipe 51 is provided with a vertical lead-in pipe 52. An outlet of the vertical lead-in pipe 52 is in communication with the inlet of the feeding pipe 51. The vertical lead-in pipe has a flat-pipe structure, and a cavity of the vertical lead-in pipe 52 is configured as a channel to allow the bottom cover to pass through. The vertical lead-in pipe 52 is configured to allow the bottom cover to be vertically introduced into the feeding pipe 51.

The bottom cover is placed into the third vibration plate. The third vibration plate leads the bottom cover from the outlet to the vertical lead-in pipe 52. The vertical lead-in pipe 52 is configured to allow the bottom cover to be vertically introduced into the feeding pipe 51, so as to allow the bottom cover to be vertically led out of the feeding pipe 51 and assemble the bottom cover with the heat sink base.

In this embodiment, a pipe wall of the feeding pipe is provided with an elongated opening 511. The elongated opening 511 is tubularly arranged along a length direction of the feeding pipe 51. A positioning sliding rod 512 is provided in the elongated opening 511. The positioning sliding rod 512 is arranged along a length direction of the elongated opening 511.

In order to ensure the accuracy of the assembly of the bottom cover E and the heat sink base, it is required to adjust the positions of the bottom cover E and the heat sink base to the correct positions. The positioning sliding rod 512 is configured to allow the notch of the bottom cover E clamped at the positioning sliding rod 512 to prevent the bottom cover E from failing to be correctly mounted on the heat sink base B caused by random rotation of the bottom cover E in the feeding pipe 51. The positioning sliding rod 512 is arranged along the length direction of the elongated opening 511, so as to effectively realize the positioning of the bottom cover E. After that, the position of the bottom cover E can just correspond to the position of the heat sink base B, ensuring the assembly accuracy of the heat sink base B and the bottom cover E.

In this embodiment, a lead-out head 513 is provided in the cavity of feeding pipe 51. A positioning elastic piece 514 is arranged on an inner wall of the feeding pipe 51. The positioning elastic piece 514 is arranged along the length direction of the feeding pipe 51 and extends out of the inner wall of the feeding pipe 51. The lead-out head 513 and the positioning elastic piece 514 are arranged spaced apart. A gap between the lead-out head 513 and the positioning elastic piece 514 is configured as an inlet for the bottom cover.

When the bottom cover led from the vertical lead-in pipe 52 into the feeding pipe 51 is deflecting, the positioning elastic piece 514 is configured to abut on an outer wall of the bottom cover to prevent the bottom cover from deflection angle. With the lead-out head 513 moves along the length direction of the feeding pipe 51, the bottom cover is configured to move along the length direction of the feeding pipe 51, such that the bottom cover abuts against the positioning elastic piece 514, and the bottom cover is led out from the mouth of the feeding pipe 51 vertically to ensure the accurate mounting of the bottom cover and the heat sink base.

To realize the deflection of the bottom cover, the notch on the bottom cover is configured to effectively be clamped into the positioning sliding rod 512 to realize an effective positioning of the bottom cover. The lead-out head 513 is provided with bristles 5131. The lead-out head 513 is rotatably arranged on a lead-out rack 5132. The lead-out rack 5132 is arranged on a lead-out mechanism. An end of the lead-out head 513 is connected to a driving unit. The driving unit is configured to drive the lead-out head 513 to rotate, where a rotation axis of the lead-out head 513 is arranged in parallel with the feeding pipe 51.

The driving unit drives the bristles 5131 of the lead-out head 513 to rotate the bottom cover until the notch on the bottom cover is clamped into the positioning sliding rod 512, such that the bristle 5131 at the position of the bottom cover continue rotating. Then the lead-out mechanism is turned on to allow the lead-out head 513 to move horizontally and the bottom cover to slide horizontally along the feeding pipe 51, thereby making the bottom cover close to the heat sink base and assembling the bottom cover and the heat sink base.

In this embodiment, the driving unit is a rotating motor arranged on the lead-out rack 5132. The rotating motor is configured to drive the lead-out head 513 to rotate. The lead-out mechanism includes a lead-out cylinder 5134 connected to the lead-out rack 5132. The lead-out cylinder 5134 is arranged in parallel with the feeding pipe 51.

When the lead-out head 513 is rotated, the rotating motor 5133 is turned on.

When the two bottom covers are led out from the feeding pipe 51, the leading-out cylinder 5134 is turned on.

To ensure that the lead wire 2 is configured to be smoothly clamped into the notch 6 of the heat sink base and the notch of the bottom cover, the lead wire threading device includes a threading base 61 rotatably connected to the turnover base 13. A hinged shaft 73 of the turnover base 13 is arranged horizontally. The turnover mechanism is configured to drive the turnover base 13 to rotate by 180°.

The turnover mechanism is turned on, which can allow the mounting surface of the heat sink base to face upwards to make the straightened lead wire 2 reliably clamped into the notch 6 of the heat sink base and the notch of the bottom cover, thereby realizing the clamping and fixing of the wire bundle 24, the heat sink base and the bottom cover.

To ensure that the lead wire 2 is configured to be reliably clamped into the notch 6 of the heat sink base and the notch of the bottom cover, a compression rod is provided at a side of the threading base 61. The compression rod abuts against a lead wire 2 of a LED lamp wick 23. The compression rod is configured to move vertically to abut against or be separated from the LED lamp wick 23.

Before the turnover base 13 is turned, the compression rod is vertical and abuts against the lead wire 2 near the heat sink base. Then the turnover mechanism is turned on to allow the lead wire 2 clamped into the notch 6 of the heat sink base and the notch of the bottom cover, thereby completing the clamping of the lead wire 2.

In this embodiment, to turn the turnover base 13, the turnover mechanism includes a turnover gear 631 connected to an end of the hinged shaft 73 of the turnover base 13. The turnover gear 631 is engaged with a turnover gear rack 632. The turnover gear rack 632 is arranged horizontally. An end of the turnover gear rack 632 is connected to a piston of a turning cylinder 633.

During the turn-over operation of the turnover base 13, a turning cylinder 633 is turned on to drive the turnover base 13 to rotate, which can allow the mounting surface of the heat sink base to face downwards, thereby allowing the wire bundle 24 clamped into the notch 6 of the heat sink base and the notch of the bottom cover to realize the threading of the wire bundle 24.

In this embodiment, the fourth feeding device includes a lamp tube feeding pipe 41. The lamp tube feeding pipe 41 is arranged on a side of an extraction rack 12 of the first feeding device 10. The lamp tube feeding pipe 41 is arranged in parallel with a length direction of the extraction rack 12 of the first feeding device 10. An end of the lamp tube feeding pipe is provided with a lamp tube guide head 42. the lamp tube guide head 42 is configured to move horizontally along the lamp tube feeding pipe 41 to assemble the lamp tube with the heat sink base.

The above-mentioned lamp tube is placed into a fourth vibration plate. The lamp tube is led out from an outlet of the fourth vibration plate to the lamp tube feeding pipe 41 to feed the lamp tube. The lamp tube guide head 42 at an end of the lamp tube feeding pipe 41 moves horizontally to allow the lamp tube move horizontally along the lamp feeding pipe 41, such that the lamp tube is assembled with the heat sink base to realize the combination and assembly of the heat sink base and the lamp tube, thereby realizing the automatic installation and production of the two components.

To ensure that the heat sink base is accurately led into a mouth at one end of the lamp tube, the positioning-mounting mechanism includes a positioning head arranged in the lamp tube feeding pipe 41. An outer wall of the lamp tube is provided with a protrusion 8. The positioning head extends to a blocking claw 43 arranged at an inner wall of the lamp tube feeding pipe. The blocking claw 43 abuts against the protrusion 8. A rotating mechanism is arranged in the lamp tube feeding pipe 41. The rotating mechanism is configured to drive the lamp tube to rotate.

To accurately position the lamp tube, the rotating mechanism is turned on to allow the lamp tube rotate and the blocking claw 43 abut against the protrusion 8 provided on the outer wall of the lamp tube to allow the lamp tube combined with the heat sink base at the setting position. Then the lamp tube guide head 42 is turned on to allow the lamp tube in plug-in fit with the heat sink base to assembly the heat sink base and the lamp tube.

In this embodiment, an end surface of the lamp tube guide head 42 is provided with rotating bristles 421. The rotating bristles 421 abut against an end of the lamp tube. The lamp tube guide head 42 is rotatably arranged on a guide head rack 44. The rotating mechanism is configured to drive the lamp tube guide head 42 to rotate on the guide head rack 44. The guide head rack 42 is connected to a guide head translation mechanism. The guide head translation mechanism is configured to drive the lamp tube guide head 42 to move along the lamp tube feeding pipe 41.

When the lamp tube is rotated, the rotating bristle 421 at a front end of the lamp tube guide head 42 abut against the lens at one end of the lamp tube to allow the lamp tube rotate to allow the blocking claw 43 abuts against the protrusion 8 provided on the outer wall of the lamp tube, so as to allow the lamp tube combined with the heat sink base at the setting position. With the lamp tube guide head 42 horizontally slides along the lamp tube feeding pipe 41, the heat sink base is just plugged in the lamp tube, and a screw installation equipment is configured to effectively realize the assembly of the bottom cover and an end of the lamp tube.

To make the lamp tube rotate and move horizontally, the guide head rack 44 is provided with a rotating motor 441. The rotating motor 441 and the lamp tube guide head 42 are active. The guide head translation mechanism is provided with a translating cylinder 45 connected with the guide head rack 44. A length direction of the translating cylinder 45 is arranged in parallel with a length direction of the lamp tube feeding pipe 41.

A method for automatically producing the LED lamp includes the following steps.

(S1) The heat sink base is placed into the first feeding device 10, and the first feeding device 10 is turned on to feed the heat sink base to an outlet of the first lead-out rail 11 of the first feeding device 10.

(S2) A reflection bowl is placed into a second feeding device 20, and the second feeding device 20 is turned on to feed the reflection bowl to an outlet of the second lead-out rail 21 of the second feeding device 20.

(S3) The LED lamp bead is stacked on the feeding rack 31 of the third feeding device 30 via an automatic stacking device, and the LED lamp bead is feed to the clamping block 32 by the third feeding device 30.

(S4) The bottom cover is placed into the fifth feeding device 50, and the fifth feeding device 50 is turned on to feed the bottom cover to the feeding pipe 51 of the fifth feeding device 50.

(S5) The lamb tube is placed into the fourth feeding device 40, and the fourth feeding device 40 is turned on to feed the lamb tube to the lamp tube feeding pipe 41 of the fourth feeding device 40.

(S6) The gluing mechanism is turned on to dispense the glue to a mounting groove of the heat sink base.

(S7) The clamping block 32 moves vertically to push the LED lamp wick 23 into the mounting groove of the heat sink base.

(S8) A compression joint 22 of the second feeding device 20 is started to move vertically to push the reflection bowl to a mounting surface of the heat sink base, so as to fixedly arrange the reflection bowl on the heat sink base.

(S9) A lead-out head 513 of the fifth feeding device 50 is started to allow the bottom cover to abut against an end of the heat sink base, and be mounted on the heat sink base.

(S10) The lead wire threading device is turned on to allow the heat sink base to rotate such that the lead wire 2 is clamped into the notch 6 of the heat sink base and the opening 19 of the bottom cover.

(S11) A lamp tube guide head 42 of the fifth feeding device is started to move to push the lamp tube to be inserted in the heat sink base.

(S12) Steps (S6)-(S11) are repeated to assembly a plurality of lamp caps.

What is claimed is:

1. A device for installing a rear cover of a lamp cap, comprising:
    a first feeding device; and
    a second feeding device;
    wherein the first feeding device is configured to lead a heat sink base out; the second feeding device is configured to feed a LED lamp bead out to an outlet of the first feeding device and assemble the LED lamp bead with the heat sink base; a third feeding device is arranged on a side of the outlet of the first feeding device; and the third feeding device is configured to mount a bottom cover on the heat sink base.

2. The device of claim 1, wherein the first feeding device is provided with a vibration plate; an outlet of the vibration plate is provided with a lead-out rail; an outlet of the lead-out rail is provided with an extraction rack; the extraction rack is arranged on a turnover base; the third feeding device is arranged on one side of the extraction rack, and a fourth feeding device is arranged on the other side of the extraction rack for feeding a lamp tube.

3. The device of claim 2, wherein the extraction rack is provided with two extraction rods; the two extraction rods are arranged horizontally and spaced apart; the two extraction rods are configured to move horizontally to respectively form a plug-in clamping fit with two notches on the heat sink base; the outlet of the lead-out rail is provided with a baffle plate; a surface of the lead-out rail is provided with two openings configured to respectively avoid the two extraction rods; the two extracting rods are slidably arranged on the extraction rack; each of the two extraction rods is sleevedly provided with a return spring; one end of the return spring abuts against one of the two extraction rods, and the other end of the return spring abuts against the extraction rack; the extraction rack is provided with a first cylinder; the first cylinder is arranged in parallel with the two extraction rods; and a piston rod of the first cylinder is connected to the two extraction rods; a turnover base is rotatably connected with the extraction rack; the extraction rack is provided with a deflection rod; the deflection rod is hinged with a piston rod of a second cylinder; the piston rod of the second cylinder and the deflection rod are arranged vertically; and the second cylinder is hingedly arranged on the turnover base.

4. The device of claim 3, wherein a support base is provided on a side of the turnover base; the support base is provided with a groove configured to clamp the heat sink base; the support base is provided with a support slide rod; the support slide rod is vertically and slidably arranged on a rack; the support slide rod is sleevedly provided with a support spring; and one end of the support spring abuts against the rack, and the other end of the support spring abuts against the support base.

5. The device of claim 2, wherein the heat sink base is provided with a notch configured to accommodate a wire bundle; the notch is arranged along an axial direction of the heat sink base; the third feeding device comprises a feeding pipe; a pipe core of the feeding pipe is horizontal and arranged in parallel with the extraction rack of the first feeding device; a mouth of the feeding pipe is arranged close to or away from an end of the heat sink base on the extraction rack; an edge of the bottom cover is provided with an opening corresponding to the notch of the heat sink base; the opening is configured to accommodate the wire bundle; an inlet of the feeding pipe is provided with a vertical lead-in pipe; an outlet of the vertical lead-in pipe is communicated with an inlet of the feeding pipe; the vertical lead-in pipe has a flat-pipe structure, and a cavity of the vertical lead-in pipe is configured as a channel to allow the bottom cover to pass through; the vertical lead-in pipe is configured to allow the bottom cover to be vertically introduced into the feeding pipe; a pipe wall of the feeding pipe is provided with an elongated opening; the elongated opening is tubularly arranged along a length direction of the feeding pipe.

6. The device of claim 5, wherein a lead-out head is provided in the cavity of the feeding pipe; the lead-out head is provided with bristles; the lead-out head is rotatably arranged on a lead-out rack; an end of the lead-out head is connected to a driving unit; the driving unit is configured to drive the lead-out head to rotate, wherein a rotation axis of the lead-out head is arranged in parallel with the feeding pipe; the driving unit is a rotating motor provided on the lead-out rack; the rotating motor is configured to drive the lead-out head to rotate; a lead-out cylinder is connected to the lead-out rack; and the lead-out cylinder is arranged in parallel with the feeding pipe.

7. The device of claim 1, wherein the second feeding device comprises a feeding rack; the feeding rack is provided with a clamping block configured to clamp the LED lamp bead; the clamping block is configured to move vertically to allow the LED lamp bead to be guided into a groove of the heat sink base; a side of the clamping block is provided with a lead wire rack configured to support a wire bundle; a gluing nozzle is provided below the clamping block, and is configured to dispense a glue on the groove of the heat sink base; the gluing nozzle is arranged on a lifting mechanism; the lifting mechanism is configured to move the gluing nozzle vertically to abut against or be separated from a bottom of the groove of the heat sink base; the clamping block is vertically arranged on a rail; the rail is provided with a return spring; an upper end of the return spring abuts against an upper end of the rail, and a lower end of the return spring abuts against an upper surface of the clamping block; a drive head is arranged above the clamping block; an upper end of the drive head is connected with a piston rod of a driving cylinder; and the driving cylinder is arranged vertically; the clamping block is vertically and slidably arranged on a lifting block; the lifting block is vertically and slidably arranged on the rail; one end of the return spring abuts against an upper end of the lifting block, and the other end of the return spring abuts against an upper end of the rail.

8. The device of claim 7, wherein a side of the clamping block is provided with two sets of clamping belts configured to clamp the LED lamp bead; an outlet of each of the two sets of clamping belts is provided with a support plate configured to support the LED lamp bead; a side of the support plate is hinged on a frame, wherein a hinge axis is arranged horizontally; the clamping block is arranged above the frame.

9. The device of claim 8, wherein the lead wire rack is provided with a grate rack; the grate rack is vertically and slidably provided on a lifting rack through a vertical sliding rod; the lifting rack is horizontally and slidably arranged on the lead wire rack; a vertical spring is sleevedly provided on the vertical sliding rod; one end of the vertical spring is connected to the lead wire rack, and the other end of the vertical spring is connected to the lifting rack; an end of the vertical sliding rod extending out of the lifting rack is provided with a lifting roller; the lifting roller abuts against a lifting folded plate; the lead wire rack is provided with a horizontal cylinder; a piston of the horizontal cylinder is connected to the lifting rack; the lifting folded plate is arranged in parallel with the horizontal cylinder.

10. A system for automatically producing a LED lamp cap, comprising:
the device of claim 1.

* * * * *